(12) United States Patent
Menard et al.

(10) Patent No.: US 10,644,871 B2
(45) Date of Patent: May 5, 2020

(54) SYNCHRONIZATION OF NETWORK DEVICES

(71) Applicant: Intel Corporation, Santa Clara, CA (US)

(72) Inventors: Alexis Menard, Hillsboro, OR (US); Thiago J. Macieira, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 800 days.

(21) Appl. No.: 15/181,189

(22) Filed: Jun. 13, 2016

(65) Prior Publication Data
US 2017/0359163 A1    Dec. 14, 2017

(51) Int. Cl.
| | |
|---|---|
| *H04L 7/04* | (2006.01) |
| *H04W 56/00* | (2009.01) |
| *H04L 29/08* | (2006.01) |
| *H04W 4/70* | (2018.01) |
| *H04L 29/06* | (2006.01) |
| *H05B 47/19* | (2020.01) |

(52) U.S. Cl.
CPC ............ *H04L 7/04* (2013.01); *H04L 67/1095* (2013.01); *H04L 67/12* (2013.01); *H04L 69/28* (2013.01); *H04W 4/70* (2018.02); *H04W 56/002* (2013.01); *H05B 47/19* (2020.01)

(58) Field of Classification Search
None
See application file for complete search history.

(56) References Cited

U.S. PATENT DOCUMENTS

| | | | | |
|---|---|---|---|---|
| 8,461,781 B2* | 6/2013 | Schenk | .............. | H05B 37/0272 315/149 |
| 9,210,192 B1* | 12/2015 | Kim | .................... | H04L 41/0806 |
| 2009/0034672 A1* | 2/2009 | Cho | ...................... | H04J 3/0664 375/364 |
| 2010/0034191 A1* | 2/2010 | Schulz | ................... | G01D 21/00 370/350 |
| 2011/0264241 A1 | 10/2011 | Pettigrew et al. | | |
| 2014/0292222 A1 | 10/2014 | Velazquez | | |
| 2015/0055450 A1* | 2/2015 | Folkmanis | .............. | H04L 45/00 370/216 |
| 2015/0115835 A1 | 4/2015 | Kim et al. | | |

(Continued)

OTHER PUBLICATIONS

International Search Report and Written Opinion dated Aug. 1, 2017 for International Application No. PCT/US2017/031608, 14 pages.

*Primary Examiner* — Thomas J Dailey
(74) *Attorney, Agent, or Firm* — Schwabe, Williamson & Wyatt, P.C.

(57) ABSTRACT

Methods, systems, and storage media for synchronizing network devices are disclosed herein. An embodiment may include sending a control signal to each of multiple devices that have device operations that are perceptible together, the control signal to control the perceptible device operation of each device. Timing information may be received from each device indicating timing of perceptible operation of the device relative to the control signal. Synchronizing control signals may be determined from the timing information to control the device operations to be perceptibly synchronous, and the synchronizing control signals may be sent to the devices to provide perceptibly synchronous operation of them.

22 Claims, 6 Drawing Sheets

(56) References Cited

U.S. PATENT DOCUMENTS

| | | | |
|---|---|---|---|
| 2015/0207561 A1 | 7/2015 | Shin et al. | |
| 2016/0073482 A1* | 3/2016 | Fok | H04L 12/282 |
| | | | 315/294 |
| 2016/0098244 A1 | 4/2016 | Hsieh et al. | |
| 2016/0255698 A1* | 9/2016 | Harbers | H05B 33/0854 |
| | | | 315/151 |
| 2016/0374043 A1* | 12/2016 | Wetterwald | H04W 4/70 |

* cited by examiner

SYNCHRONIZATION OF NETWORK DEVICES

FIELD

The present disclosure relates to the field of Internet of Things ("IoT"), and in particular, to apparatuses, methods and storage media associated with synchronizing operation of network devices that may be perceptible together.

BACKGROUND

The Internet of Things ("IoT") is a network of objects or "things", each of which may be embedded with hardware and/or software that may enable connectivity to the Internet. In some embodiments, an object, device, sensor, or "thing" (also referred to as an "IoT device") that is connected to a network may provide information to a manufacturer, operator, or other connected devices or clients in order to track information from or about the object or to obtain or provide services. In other embodiments, IoT devices may be operated or controlled over a network. For example, such devices may be deployed in or in connection with homes, commercial establishments, and/or offices and may control devices that may be perceptible by users such as in connection with audio systems, displays, lighting, etc. In some embodiments, multiple IoT may be operated so as to be perceptible together. Different devices may have different network latencies or different responses to controls which may create between the devices a perceptible asynchronicity that can diminish the quality of the user experience.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
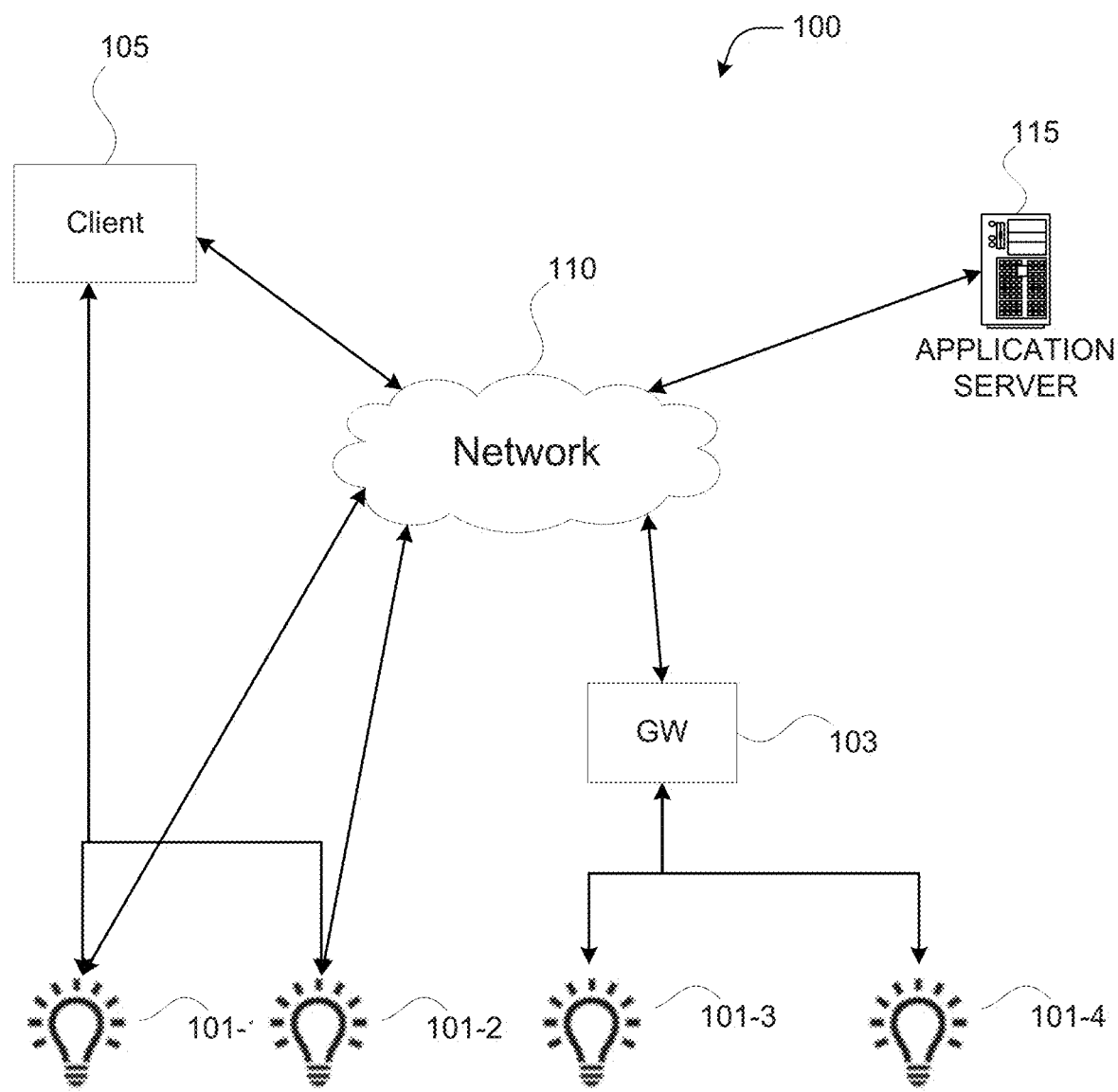
FIG. 1 illustrates a computer network in which various example embodiments described in the present disclosure may be implemented.

In the following detailed description, reference is made to the accompanying drawings which form a part hereof wherein like numerals designate like parts throughout, and in which is shown by way of illustrated embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed to imply that the various operations are necessarily order-dependent. In particular, these operations might not be performed in the order of presentation. Operations described may be performed in a different order than the described embodiments. Various additional operations might be performed, or described operations might be omitted in additional embodiments.

The description may use the phrases "in an embodiment", "in an implementation", or in "embodiments" or "implementations", which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include any or any combination of an Application Specific Integrated Circuit (ASIC), an electronic circuit, a processor (shared, dedicated, or group) or memory (shared, dedicated, or group) that execute one or more software or firmware programs, a combinational logic circuit, or other suitable components that provide the described functionality.

Also, it is noted that example embodiments may be described as a process depicted with a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in a figure. A process may correspond to a method, a function, a procedure, a subroutine, a subprogram, and the like. When a process corresponds to a function, its termination may correspond to a return of the function to the calling function a main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used herein, the term "network element", may be considered synonymous to or referred to as a networked computer, networking hardware, network equipment, router, switch, hub, bridge, gateway, or other like device. The term "network element" may describe a physical computing device of a network with wired or wireless communication links. Furthermore, the term "network element" may describe equipment that provides radio baseband functions for data or voice connectivity between a network and one or more users.

Example embodiments disclosed herein include systems and methods relating to operation of devices that may collect, process, and transmit data. Such devices may sometimes be referred to as "Internet of Things" (IoT) devices. It should be noted that objects, sensors, or other like devices that are part of the IoT may be referred to as "IoT devices", "smart objects", "smart devices", and the like. The IoT is a network of objects that may be embedded with hardware and/or software components that may enable the objects to communicate over a communications network (e.g., the Internet). Because the IoT devices are enabled to communicate over a network, the IoT devices may receive control signals from a control system.

FIG. 1 shows a computer network 100 in accordance with various embodiments as an operating environment. As shown in FIG. 1, computer network 100 may include IoT devices 101-1 to 101-4 (collectively referred to as "devices 101"), gateway (GW) 103, client device 105, communications network 110, and application server 115, which may be coupled with each other as shown.

In general, devices 101 may be any object, device, sensor, or "thing" that may be embedded with hardware and/or software components that enable the object, device, sensor, or "thing" to communicate with another device (e.g., client device 105, application server 115, another device 101, etc.) over a network (e.g., network 110) with little or no user intervention. In this regard, devices 101 may include a transmitter/receiver (or alternatively, a transceiver), one or more memory devices, and/or one or more processors. Furthermore, devices 101 may be embedded with or otherwise include a transmitter or other like device that broadcasts an identification signal. In various embodiments, the identification signal may be a radio-based signal, such as a Wi-Fi signal, Bluetooth Low Energy (BLE) signal, an active radio-frequency identification (RFID) signal, an infrared signal, and the like.

In embodiments described below, a device 101 may provide an operation that may be perceptible by a user or other device. In embodiments, two or more devices 101 may provide operations that may be perceptible by a user together. For example, the two or more devices 101 may provide any of lighting, image display, audio output, mechanical activation, or other operations that a user may perceive together. Asynchronicity in the operation of the two or more devices 101 may be perceptible by the user. For example, users may perceive variations as small as 100 milliseconds (mS) in the operation and/or activation of some devices that are together within a user's perception. In some embodiments, asynchronicity in the operation of the two or more devices 101 may be perceptible by the client device 105 or GW 103, one or more applications or components implemented in the client device 105 or GW 103, or a separate measuring device. Network communications that control devices 101 and other device responsiveness may include variations of more than 100 mS.

GW 103 may be a network element configured to provide communication services to IoT devices 101 and/or client devices (e.g., client device 105) operating within a computer network (e.g., an enterprise private network, virtual private network, local area network (LAN), a virtual local area network (VLAN), and/or any other like computer network). The GW 103 may be a wired or wireless access point, a router, a switch, a hub, and/or any other like network device that allows computing devices to connect to a network.

The GW 103 may include one or more processors, a network interface, one or more transmitters/receivers connected to one or more antennas, and a computer readable medium. The one or more transmitters/receivers may be configured to transmit/receive data signals to/from one or more IoT devices 101 and/or client device 105. The GW 103 may process and/or route data packets according to one or more communications protocols, such as Ethernet, Point-to-Point Protocol (PPP), High Level Data Link Control (HDLC), Internet Protocol version 4 (IPv4), Internet Protocol version 6 (IPv6), and/or any other like protocols. The GW 103 may employ one or more network interfaces in order to allow IoT devices 101 and/or client device 105 to connect to network 110, such as Ethernet, Fibre Channel, G.hn or ITU-T, 802.11 or Wi-Fi, Bluetooth, and/or any other like network connection interfaces.

According to various embodiments, the GW 103 may act as a central hub for one or more devices 101 (e.g., device 101-3 and device 101-4 as shown in FIG. 1). In such embodiments, GW 103 may be a part of a private IoT network that is operated by a single service provider, IoT device manufacturer, and/or any other like entity. In embodiments where GW 103 is a hub for devices 101 that are included in a private IoT network, GW 103 may connect the devices 101 in the private IoT network to the network 110 and/or client device 105. As shown in FIG. 1, GW 103 is connected to IoT devices 101-3 and 101-4, and thus, GW 103 may enable IoT devices 101-3 and 101-4 to provide services or information to client device 105 via network 110. However, in various embodiments client device 105 may directly connect with GW 103, such that GW 103 may enable IoT devices 101-3 and 101-4 to provide services or information to client device 105 via the direct connection.

Network 110 may be any network that allows computers to exchange data. Network 110 may include one or more network elements (not shown) capable of physically or logically connecting computers. The network 110 may include any appropriate network, including an intranet, the Internet, a cellular network, a local area network (LAN), a personal network or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof.

In general, client device 105 and application server 115 each may be a hardware computing device that may include one or more systems and/or applications for providing one or more services. Client device 105 and application server 115 each may include a processor, memory or computer readable storage medium, and a network interface. Additionally, client device 105 and application server 115 may each be a single physical hardware device, or may be physically or logically connected with other network devices, so as to reside on one or more physical hardware devices. Furthermore, client device 105 and application server 115 each may be connected to, or otherwise associated with one or more data storage devices (not shown). The application server 115 may be any device capable of receiving and responding to requests from one or more client devices (e.g., client device 105) across a computer network (e.g., network 110) to provide one or more services client device 105.

In FIG. 1, only four devices 101, one GW 103, one client device 105, and a single application server 115 are shown. According to various embodiments, any number of devices, any number of gateways, any number of client devices, any number of servers, and/or any number of databases (not shown) may be present. Additionally, in some embodiments, application server 115 may be a virtual machine and/or may be provided as part of a cloud computing service. In various embodiments, application server 115 may reside on one physical hardware device, and/or may be otherwise fully integrated with one another. Thus, the depiction of the illustrative computer network 100 in FIG. 1 should be taken as being illustrative in nature, and not limited to the scope of the disclosure.

Figure 2:
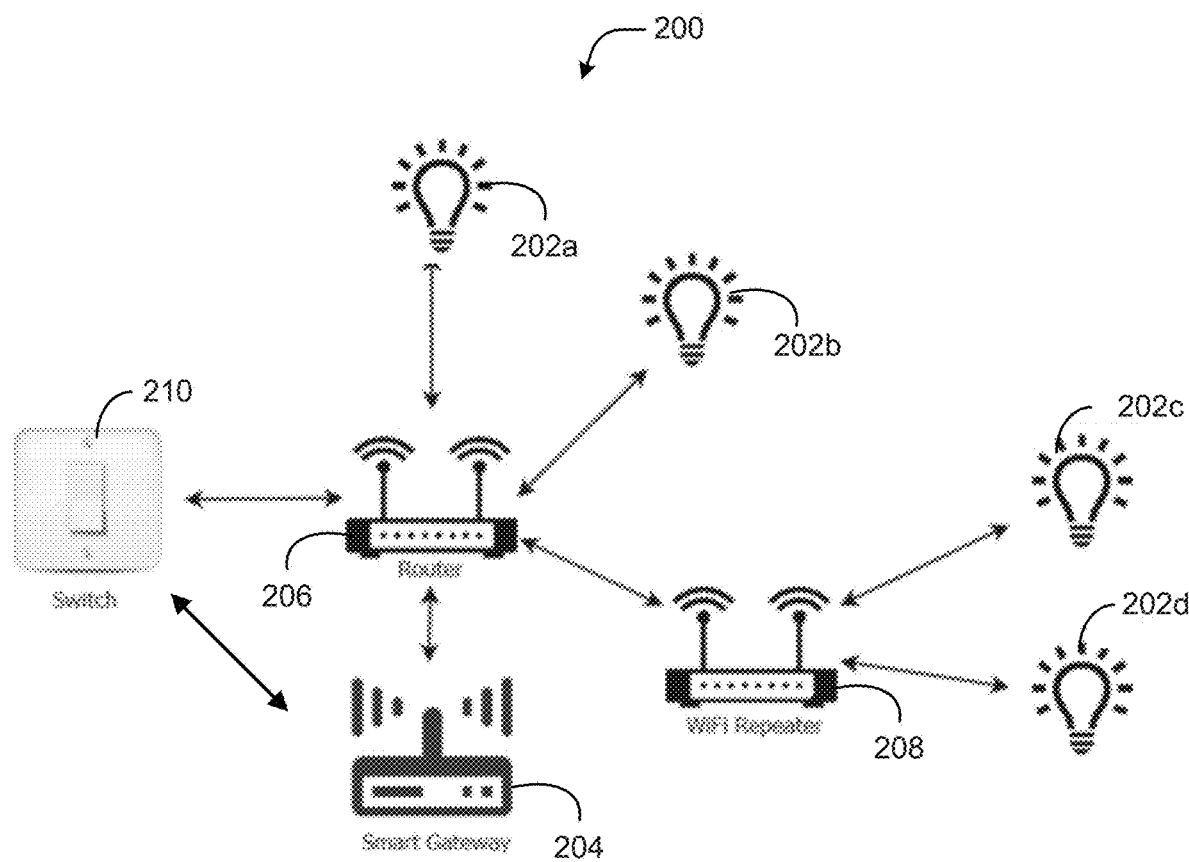
FIG. 2 is a diagram of an embodiment of a multiple device network system that may be an example operating environment for embodiments described herein.

FIG. 2 is a diagram of an embodiment of a multiple device network system 200 that may be analogous to computer network 100 and may be an example operating environment for embodiments described herein. Network system 200 may operate together multiple IoT network devices 202a-202d (e.g., network device light bulbs 202a-202d) that may be perceptible together by a user. In alternate embodiments, network devices 202a-202d may be image displays, audio outputs, mechanical activations, or other operations that a user may perceive together. Network system 200 may be a simplified representation of a "smart home" or a "smart building" system as an illustration of embodiments described herein. Network system 200 may operate in connection with a wireless (e.g., Wi-Fi) network, for example. Network system 200 may be controlled by a smart gateway 204, which may be in communication with a router 206 and a wi-fi repeater 208, for example, which may be in wireless communication with network device light bulbs 202a-202d, as illustrated. A switch 210 may be operable to control example network device light bulbs 202a-202d together and may be implemented as a "smart" wall switch or as a virtual switch operated by a user-controlled computing device (not shown), such as a tablet or other computer, a smart phone, a wearable device, or another computing device.

In addition to illustrating coordinated operations of network device light bulbs 202a-202d, network system 200 illustrates variations in pathways between switch 210 and each network device light bulb 202. For example, with activation of switch 210 a control signal activating network device light bulbs 202a-202d may pass from switch 210 to smart gateway 204 via router 206 or, alternatively, the control signal may pass directly from switch 210 to smart gateway 204. The control signal activating network device light bulbs 202a and 202b may then pass from smart gateway 204 to network device light bulbs 202a and 202b via router 206. The control signal activating network device light bulbs 202c and 202d may pass from smart gateway 204 to network device light bulbs 202c and 202d via router 206 and wi-fi repeater 208.

Figure 3:
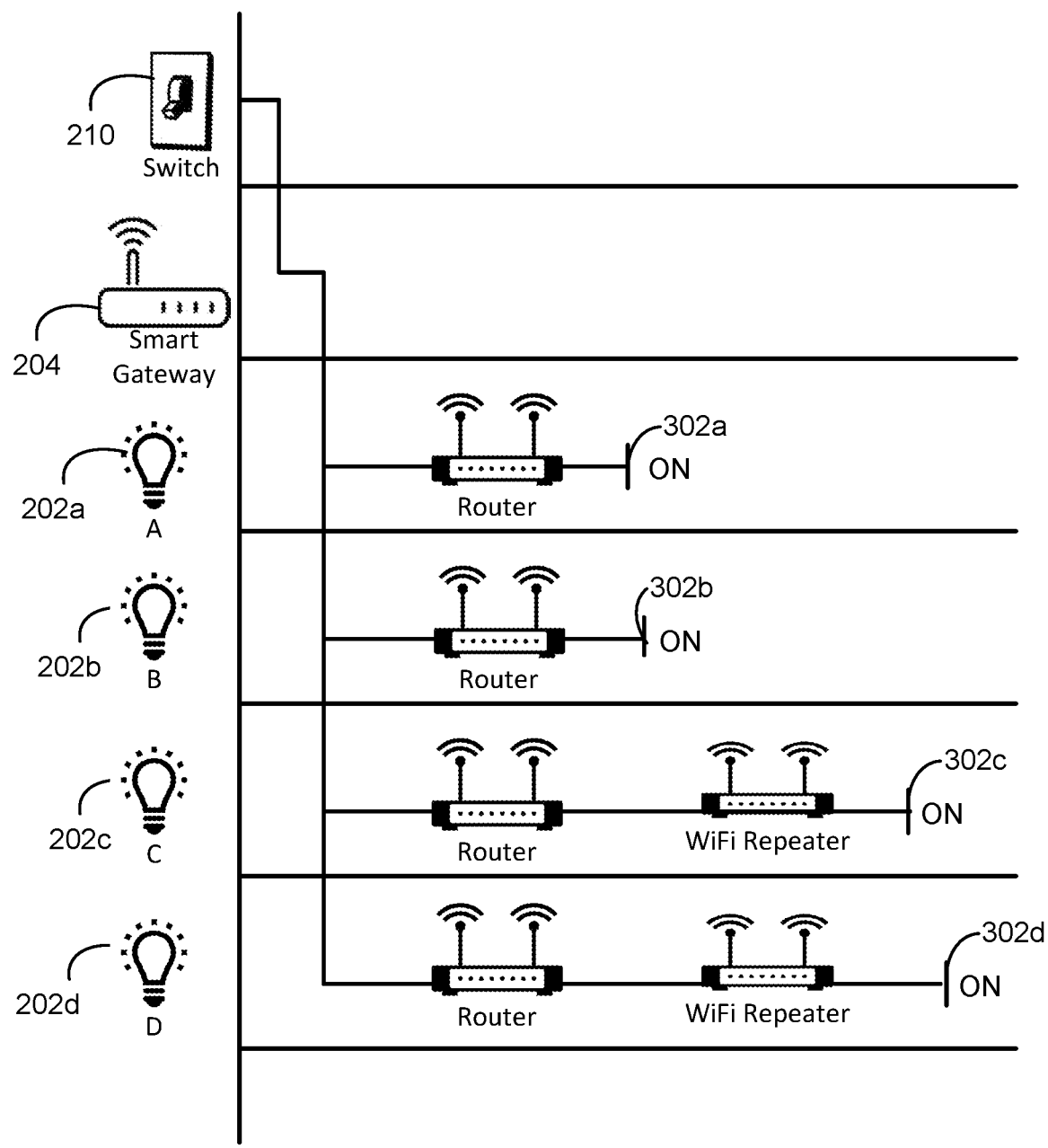
FIG. 3 illustrates relative timing of device activation of network devices that may be based in part on control signal pathway variations, according to embodiments described herein.

In addition to variations in device responsiveness to control signals, the variations in pathways may have different network latencies and/or jitter that may contribute to variations in timing of activating control signals reaching the network device light bulbs 202. Also, the reliability of WiFi or other wireless technology which may introduce delays or instability while transmitting control signals. FIG. 3 illustrates relative timing of device activation of network device light bulbs 202a-202d that may be based in part on control signal pathway variations, according to various embodiments. For example, the control signal activating network device light bulbs 202a and 202b may have respective timings 302a and 302b, based on the control signal passing from switch 210 to smart gateway 204 (via router 206) and back through router 206 to network device light bulbs 202a and 202b. The control signal activating network device light bulbs 202c and 202d may have respective timings 302c and 302d, which are longer than timings 302a and 302b, based on the control signal additionally passing through wi-fi repeater 208 to network device light bulbs 202c and 202d. The timings 302a-302d may be sufficiently asynchronous that a user could perceive that all the network device light bulbs 302a-302d at different times, or the user could perceive that the network device light bulbs 302a, 302b turn-on or turn-off before network device light bulbs 302c, 302d.

Figure 4:
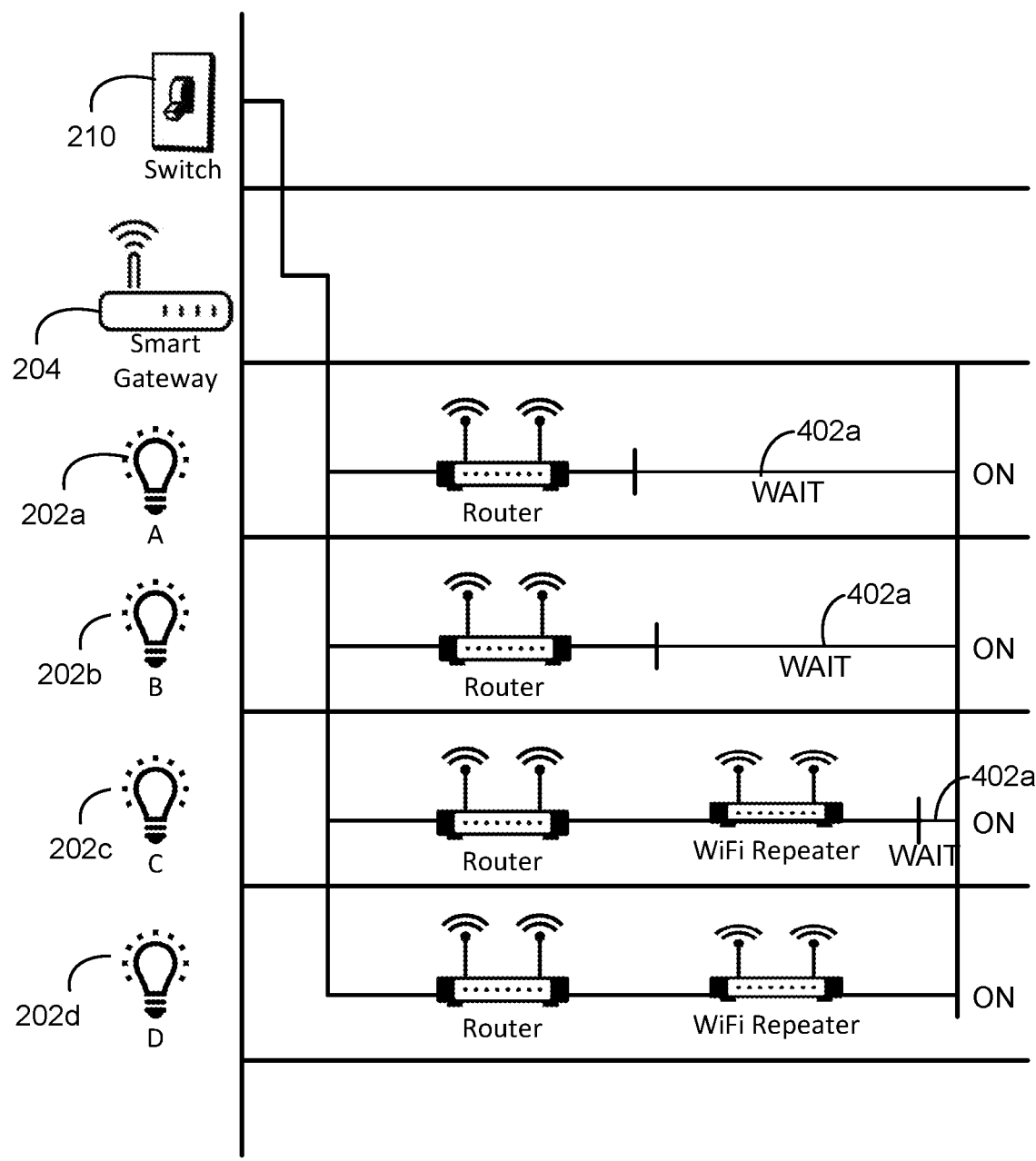
FIG. 4 illustrates perceptively synchronous activation of network devices that may be based on synchronized control signals that may be provided according to embodiments described herein.

FIG. 4 illustrates a perceptively synchronous activation of network device light bulbs 202a-202d that may be based on synchronized control signals that may be provided according to embodiments described herein. For example, the control signals activating network device light bulbs 202a-202c may include synchronizing delays or pauses 402a-402c, respectively, so that network device light bulbs 202a-202c may be synchronized with network device light bulb 202d. In the illustration of FIG. 4, network device light bulb 202d has the greatest delay in activation of the network device light bulbs 202a-202d, so that delays or pauses 402a-402c may synchronize network device light bulbs 202a-202c with network device light bulb 202d. In addition to incorporating synchronizing delays or pauses 402a-402c into activating control signals for network device light bulbs 202a-202c, embodiments may include determining the synchronizing delays or pauses 402a-402c to be incorporated. In addition to (or alternative to) the synchronizing delays or pauses 402a-402c, in some embodiments other control signal types or indicators may be incorporated into the synchronizing control signals to provide desired user experiences. These control signal types or indicators may be referred to as "effects." Example effects may include power, brightness, volume, color, hue, phase, chroma, polarization, and/or other like signal levels. The particular effects to be incorporated into the control signals may be based on a group or spectrum of options that may alter user experience depending on user preferences or other criteria.

For example, the aforementioned synchronizing control signals may include other synchronizing delays or pauses, so that network device light bulbs 202a-202c may be switched on or activated in a desired order or sequence. By way of another example, the synchronizing control signals may include power indicators that may indicate a specified or desired power output or level at which to operate the network device light bulbs 202a-202d. The power output specified by the power indicators may provide a desired dimming effect. By way of another example, control signals activating a network-enabled television, such as a "smart TV" (not shown), and network-enabled audio output devices, such as one or more speakers or a home theater system (not shown), may include indicators for brightness and volume, respectively, so that the network-enabled television may output images at a desired brightness while the network-enabled audio output devices output audio signals at a desired volume. These control signals may also include synchronizing control signals similar to those previously mentioned such that the desired brightness of the network-enabled television is output in a desired synchronicity with the desired volume of the network-enabled audio output devices output audio signals.

Figure 5:
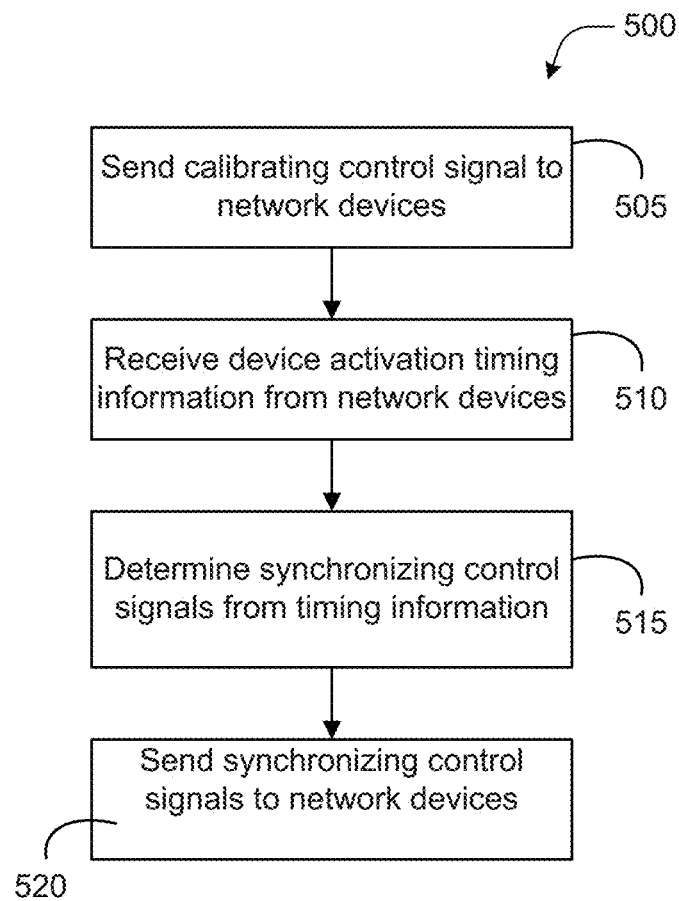
FIG. 5 is a flowchart illustrating an example process of providing perceptively synchronous activation of network devices, according to embodiments described herein.

FIG. 5 is a flowchart 500 illustrating an example process of providing perceptively synchronous activation of network devices, according to various embodiments. For illustrative purposes, the operations of flowchart 500 will be described with respect to smart gateway 204 and network device light bulbs 202a-202d. The operations in FIG. 5 may be performed e.g., by smart gateway 204, which in embodiments, may include a calibration module 605 and a control module 610 (to be described more fully with reference to FIG. 6. Thus, FIG. 5 also depicts the algorithmic structures of calibration module 605 and control module 610 of smart gateway 204. It will be appreciated, however, that the operations of flowchart 500 may provide perceptively synchronous activation of arbitrary network devices. Moreover, while particular examples and orders of operations are illustrated in FIG. 5, in various embodiments, these operations may be re-ordered, separated into additional operations, combined, or omitted altogether.

At 505, a calibrating control signal may be sent to each of plural network devices (e.g., network device light bulbs 202a-202d) that have device operations that may be perceptible together. In embodiments, the calibrating control signal may be sent from smart gateway 204 (e.g., by the control module 610 at the direction of the calibration module 605). In alternate embodiments, the calibrating control signal may be sent by another computing device. The calibrating control signal may include a common control signal component to activate the perceptible device operation of each device in a manner that may be common and/or conventional, and a calibrating signal component in response to which each network device is to return timing information indicating when the perceptible device operation of the network device is activated in response to the common control signal component.

At 510, device activation timing information may be received (e.g., by smart gateway 204) from each of the plural network devices indicating timing of perceivable/perceptible operation of each device relative to the common control signal component. In one embodiment, the timing information may indicate specific times when the calibrating control signal is received and when the device activation occurs. In another embodiment, the timing information may be a simple indication that device activation has occurred, and a determination may be made (e.g., by smart gateway 204) on the timing of the device activation upon receiving the indication of device activation. In some embodiments, another device (e.g., a component implemented by the client device 105 or switch 210) may determine the timing of the device activation upon receiving some indication of device activation, such as measuring a time difference between sending an instruction (e.g., to the smart gateway 204 or router 206) and using one or more sensors to detect the device activation (e.g., a light sensor or image capture device detecting light from one or more of network device light bulbs 202a-202d).

At 515, synchronizing control signals may be determined from the timing information received from the network devices. The synchronizing control signals are to control the device operations to be perceptibly synchronous. In one embodiment, the synchronizing control signal for each network device may be determined or selected specifically to synchronize the network device with, for example, a network device with the greatest activation time. As described with reference to FIG. 4, for example, the synchronizing control signals for network device light bulbs 202a-202c may include synchronizing delays or pauses 402a-402c, respectively, so that network device light bulbs 202a-202c may be synchronized with network device light bulb 202d. In some embodiments, the synchronizing control signal for each network device may be determined or selected based on user-defined criteria or desired effect, a user sense involved in perceiving the asynchronicity, a time of day, other devices that are detected in the environment, and/or other like criteria. For example, the synchronizing control signals for network device light bulbs 202a-202c may include power indicators that indicate to increment or decrement the power output over a desired period of time. The power indicators may be incorporated into the synchronizing control signals to provide a dimming effect for the network device light bulbs 202a-202c, and the power indicators may be incorporated into the synchronizing control signals based on a time of day that the synchronization control signals are communicated. In another embodiment, the network devices may all have a common synchronizing start time, according to a network clock, that is sufficient for all devices to activate synchronously. Specification of the calibrating control signal at 505 and the operations of 510 and 515 (by e.g., calibration module 605 of gateway 204 and/or another computing device) may be referred to as operating in a calibration mode or as a calibration module.

At 520, synchronizing control signals may be sent to the network devices to provide perceptibly synchronous operation of them. Sending of the calibrating control signal at 505 and the synchronizing control signals at 520 (by e.g., the control module 610 of gateway 204 and/or another computing device) may be referred to as operating in a control mode or as a control module.

Figure 6:
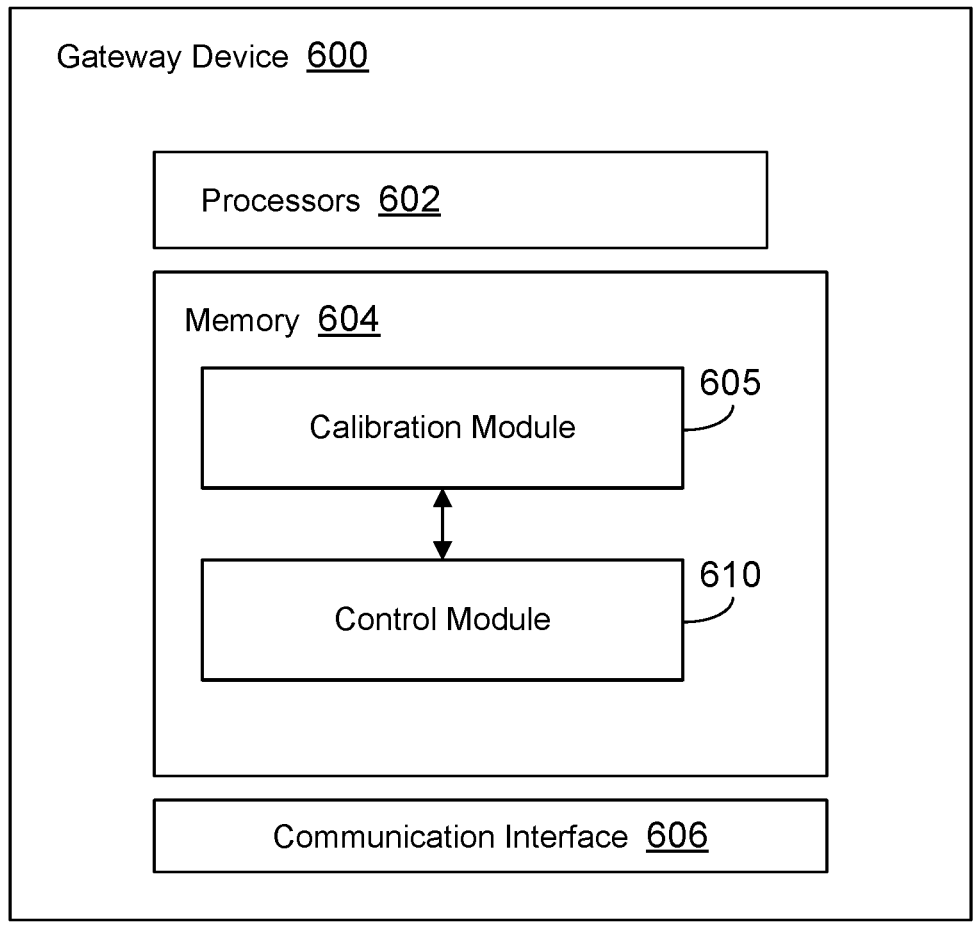
FIG. 6 is a block diagram of calibration module and control module that may provide perceptively synchronous activation of network devices, according to embodiments described herein.

FIG. 6 is a block diagram of an example gateway device 600 having calibration module 605 and control module 610, which may be included to implement smart gateway 204, for example, according to various embodiments. For the illustrated embodiments, device 600 includes one or more processors 602, memory 604 and communication interface 606, coupled to each other. Calibration module 605 and control module 610 are disposed in memory 604 and operated by processors 602 to perform operations as described with reference to flow chart 500 and network system 200.

In embodiments, control module 610, in response to execution by processors 602, may send calibrating control signals and synchronizing control signals to network devices 202a-202d to, respectively, calibrate and synchronize operations of the devices that are perceptible together. In embodiments, calibration module 605, in response to execution by processors 602, may instruct control module 610 to send the calibrating control signals to the network devices 202a-202d, and the calibration module 605 may receive from the network devices 202a-202d timing information, in response to the calibration control signals, indicating timing of the perceptible operations of the network devices 202a-202d relative to the calibrating control signals. Calibration module 605 may determine the synchronizing control signals from the timing information and may provide the synchronous control signals to the control module 610. Control module 610 may then send the synchronizing control signals to selected ones of network devices 202a-202d to control the device operations to be perceptibly synchronous.

In embodiments, calibration module 605 and control module 610 may be implemented in assembly language instructions support by a-processors 602 of smart gateway 204, or in higher level programming language, such as C, that can be compiled into the supported assembly language.

Some non-limiting Examples are provided below.

Example 1 may include an apparatus, which may comprise one or more processors; a control module to be operated by at least one of the one or more processors to send calibrating control signals and synchronizing control signals to selected ones of plural devices to respectively calibrate and synchronize device operations of the devices that are perceptible together, the synchronizing control signals to control the device operations to be perceptibly synchronous; a calibration module to be operated by at least one of the one or more processors to instruct the control module to send the calibrating control signals to the plural devices, wherein the calibration module is to receive from the plural devices timing information, in response to the calibration control signals, indicating timing of the perceptible operations of the plural devices relative to the calibrating control signals, to determine the synchronizing control signals from the timing information, and to provide the synchronous control signals to the control module.

Example 2 may include the apparatus of example 1, or any other example herein, wherein the calibration module is to receive timing information from the plural devices that includes a reply from each of the plural devices indicating that a perceptible operation of the device is commenced in response to the calibrating control signal.

Example 3 may include the apparatus of example 1 or 2, or any other example herein, wherein the control module is to send synchronizing control signal to each device that includes a timing component to provide operation of the device that is perceptibly synchronous with operation of the other devices.

Example 4 may include the apparatus of example 3, or any other example herein, wherein the timing component of the synchronizing control signal of each device corresponds specifically to the timing information received from the device.

Example 5 may include the apparatus of example 3, or any other example herein, wherein the timing information from the plural devices includes timing information from at least one device indicating a device response time of greatest duration relative to device response times of the other devices and wherein the synchronizing control signals of the plural devices include a common timing component with a duration of at least the device response time of greatest duration.

Example 6 may include the apparatus of examples 3-5, or any other example herein, wherein the timing information is based on one or more parameters including one or more user-defined criteria, a sense or device used to perceive the device operation, a time of day, and detection of one or more other devices in an environment in which the selected ones of the plural devices are deployed; and wherein the duration of the common timing component is based on the one or more parameters.

Example 7 may include the apparatus of examples 3-6, or any other example herein, wherein the synchronizing control signals of the plural devices include a power indicator to indicate a desired amount of power that the plural network devices are to output.

Example 8 may include the apparatus of examples 3-7, or any other example herein, wherein, when at least one of the plural network devices includes an image output device, the synchronizing control signals of the plural devices further include one or more of a brightness indicator to indicate a desired amount of brightness that the plural network devices are to output, a color indicator to indicate one or more desired colors, phases, or hues that the plural network devices are to output, and/or a polarization indicator to indicate a desired polarization that the plural network devices are to output.

Example 9 may include the apparatus of examples 3-8, or any other example herein, wherein when at least one of the plural network devices includes an audio output device, the synchronizing control signals of the plural devices further include a volume indicator to indicate a desired amount of volume that the plural network devices are to output.

Example 10 may include the apparatus of example 1 or 2, or any other example herein, wherein the device operation of one or more of the plural devices includes a visible operation.

Example 11 may include the apparatus of example 10, or any other example herein, wherein the visible operation includes activation of a light.

Example 12 may include the apparatus of example 1 or 2, or any other example herein, wherein the device operation of one or more of the plural devices includes an audible operation.

Example 13 may include a method, which may comprise sending a control signal to each of plural devices that have device operations that are perceptible together, the control signal to control the perceptible device operation of each device; receiving from each of the plural devices timing information indicating timing of perceptible operation of the device relative to the control signal; determining synchronizing control signals from the timing information, the synchronizing control signals to control the device operations to be perceptibly synchronous; and sending the synchronizing control signals to two or more of the plural devices to provide perceptibly synchronous operation of the two or more devices.

Example 14 may include the method of example 13, or any other example herein, wherein receiving timing information from each of the plural devices that includes a reply indicating perceptible operation of the device is commenced in response to the control signal.

Example 15 may include the method of example 13 or 14, or any other example herein, wherein the synchronizing control signal of each device includes a timing component to provide operation of the device that is perceptibly synchronous with operation of the other devices.

Example 16 may include the method of example 15, or any other example herein, wherein the timing component of the synchronizing control signal of each device corresponds specifically to the timing information received from the device.

Example 17 may include the method of example 15, or any other example herein, wherein the timing information from the plural devices includes timing information from at least one device indicating a device response time of greatest duration relative to device response times of the other devices and wherein the synchronizing control signals of the plural devices include a common timing component with a duration of at least the device response time of greatest duration.

Example 18 may include the method of example 13 or 14, or any other example herein, wherein the device operation of one or more of the plural devices includes a visible operation.

Example 19 may include the method of example 18, or any other example herein, wherein the visible operation includes activation of a light.

Example 20 may include the method of example 13 or 14, or any other example herein, wherein the device operation of one or more of the plural devices includes an audible operation.

Example 21 may include at least one computer-readable medium including instructions to cause a device, in response to execution of the instructions by the device, to: send a control signal to each of plural devices that have device operations that are perceptible together, the control signal to control the perceptible device operation of each device; receive timing information indicating timing of perceptible operation of each device relative to the calibrating control signal; determine synchronizing control signals from the timing information, the synchronizing control signals to control the device operations to be perceptibly synchronous; and send the synchronizing control signals to two or more of the plural devices to provide perceptibly synchronous operation of the two or more devices.

Example 22 may include the at least one computer-readable medium of example 21, or any other example herein, wherein the timing information includes a reply from each of the plural devices that perceptible operation of the device is commenced in response to the calibrating control signal.

Example 23 may include the at least one computer-readable medium of example 21 or 22, or any other example herein, wherein the synchronizing control signal of each device includes a timing component to provide operation of the device that is perceptibly synchronous with operation of the other devices.

Example 24 may include the at least one computer-readable medium of example 23, or any other example herein, wherein the timing component of the synchronizing control signal of each device corresponds specifically to the timing information received from the device.

Example 25 may include the at least one computer-readable medium of example 23, or any other example herein, wherein the timing information from the plural devices includes timing information from at least one device indicating a device response time of greatest duration relative to device response times of the other devices and wherein the synchronizing control signals of the plural devices include a common timing component with a duration of at least the device response time of greatest duration.

Example 26 may include the at least one computer-readable medium of example 21 or 22, or any other example herein, wherein the device operation of one or more of the plural devices includes a visible operation.

Example 27 may include the at least one computer-readable medium of example 25, or any other example herein, wherein the visible operation includes activation of a light.

Example 28 may include the at least one computer-readable medium of example 21, or any other example herein, wherein the device operation of one or more of the plural devices includes an audible operation.

Example 29 may include an apparatus, which may comprise: means to send a control signal to each of plural devices that have device operations that are perceptible together, the control signal to control the perceptible device operation of each device; means to receive from each of the plural devices timing information indicating timing of perceptible operation of the device relative to the control signal; means to determine synchronizing control signals from the timing information, the synchronizing control signals to control the device operations to be perceptibly synchronous; and means to send the synchronizing control signals to two or more of the plural devices to provide perceptibly synchronous operation of the two or more devices.

Example 30 may include the apparatus of example 29, or any other example herein, wherein the timing information includes from each of the plural devices a reply indicating perceptible operation of the device is commenced in response to the control signal.

Example 31 may include the apparatus of example 29 or 30, or any other example herein, wherein the synchronizing control signal of each device includes a timing component to provide operation of the device that is perceptibly synchronous with operation of the other devices.

Example 32 may include the apparatus of example 31, or any other example herein, wherein the timing component of the synchronizing control signal of each device corresponds specifically to the timing information received from the device.

Example 33 may include the apparatus of example 31, or any other example herein, wherein the timing information from the plural devices includes timing information from at least one device indicating a device response time of greatest duration relative to device response times of the other devices and wherein the synchronizing control signals of the plural devices include a common timing component with a duration of at least the device response time of greatest duration.

Example 34 may include the apparatus of example 29 or 30, or any other example herein, wherein the device operation of one or more of the plural devices includes a visible operation.

Example 35 may include the apparatus of example 34, or any other example herein, wherein the visible operation includes activation of a light.

Example 36 may include the apparatus of example 29 or 30, or any other example herein, wherein the device operation of one or more of the plural devices includes an audible operation.

Example 37 may include an apparatus, comprising: a control module to be operated by one or more processors to send calibrating control signals or synchronizing control signals to selected ones of plural devices to respectively calibrate or synchronize device operations of the devices, wherein the synchronizing control signals are to control the device operations according to one or more criteria; and a calibration module to be operated by at least one of the one or more processors to instruct the control module to send the calibrating control signals to the plural devices, wherein the calibration module is to receive from the plural devices device operation information, in response to the calibration control signals, indicating one or more device operation parameters of the plural devices relative to the calibrating control signals, to determine the synchronizing control signals from the device operation information, and to provide the synchronous control signals to the control module.

Example 38 may include the apparatus of example 37 and/or some other example herein, wherein the synchronizing control signal of each device includes a timing component to provide operation of the device that is perceptibly synchronous with operation of the other devices.

Example 39 may include the apparatus of example 38, wherein the device operation of one or more of the plural devices includes activation of a light, and wherein the timing component of the synchronizing control signal of each device corresponds to the timing information received from the device.

Example 40 may include the apparatus of example 38 and/or some other example herein, wherein the timing information from the plural devices includes timing information from at least one device indicating a device response time of greatest duration relative to device response times of the other devices and wherein the synchronizing control signals of the plural devices include a common timing component with a duration of at least the device response time of greatest duration.

Example 41 may include the apparatus of example 38 and/or some other example herein, wherein the timing information is based on one or more parameters including one or more user-defined criteria, a sense or device used to perceive the device operation, a time of day, and detection of one or more other devices in an environment in which the selected ones of the plural devices are deployed; and wherein the duration of the common timing component is based on the one or more parameters.

Example 41 may include the apparatus of examples 37-40 and/or some other example herein, wherein the one or more device operation parameters indicate a current output power, a current brightness, a current color scheme, phases, or hues, or a current polarization, or current audio output level.

Example 42 may include the apparatus of examples 40-41 and/or some other example herein, wherein: the synchronizing control signals include a power indicator to indicate a desired amount of power that the plural network devices are to output, when at least one of the plural network devices includes an image output device, the synchronizing control signals of the plural devices further include one or more of a brightness indicator to indicate a desired amount of brightness that the plural network devices are to output, a color indicator to indicate one or more desired colors, phases, or hues that the plural network devices are to output, and/or a polarization indicator to indicate a desired polarization that the plural network devices are to output, or when at least one of the plural network devices includes an audio output device, the synchronizing control signals of the plural devices further include a volume indicator to indicate a desired amount of volume that the plural network devices are to output.

Example 43 may include the apparatus of examples 37-42 and/or some other example herein, wherein the control module is to determine or select the one or more criteria based on one or more user-defined criteria, a desired effect, a user sense involved in perceiving asynchronicity, a time of day, or other devices that are detected in the environment.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed:

1. A gateway apparatus, comprising:
   communication circuitry to couple a plurality of devices to a network;
   one or more processors;
   a control module to be operated by at least one of the one or more processors to send, via the communication circuitry, calibrating control signals and synchronizing control signals to selected ones of the plurality of devices to respectively calibrate and synchronize device operations of the selected devices that are perceptible together by a user, the calibrating control signals being sent to elicit timing information associated with performance of the perceptible together device operations from the selected devices to determine the synchronizing control signals, and the synchronizing control signals being sent to control the perceptible together device operations of the selected devices, so their performances are perceptibly synchronous; and
   a calibration module to be operated by at least one of the one or more processors to instruct the control module to send the calibrating control signals to the selected devices, wherein the calibration module is to receive from the selected devices the elicited timing information, in response to the calibrating control signals, indicating respective timing of the perceptible together operations of the selected devices, and wherein the calibration module is to determine the synchronizing control signals based at least in part on the received timing information, and to provide the synchronizing control signals to the control module to provide to the selected devices to synchronize their perceptible together device operations.

2. The apparatus of claim 1, wherein the calibration module is to receive the elicited timing information from the selected devices that includes a reply from each of the selected devices indicating that the perceptible together operation of the selected device is commenced, in response to the calibrating control signal.

3. The apparatus of claim 1, wherein the control module is to send a synchronizing control signal to each of the selected devices that includes a timing component associated with synchronizing the performance of the perceptible together operation by the selected device with the performance of the perceptible together operation by other selected devices.

4. The apparatus of claim 3, wherein the timing component of the synchronizing control signal provided to each of the selected devices is based at least in part correspondingly on the timing information received from the selected device.

5. The apparatus of claim 3, wherein the timing information from the selected devices includes timing information from at least one selected device indicating a device response time of greatest duration relative to device response times of the other selected devices, and wherein the synchronizing control signals provided to the selected devices include a common timing component that is based at least in part on the device response time of greatest duration.

6. The apparatus of claim 1, wherein the perceptible together device operation of the selected devices includes an operation visibly perceptible together by the user.

7. The apparatus of claim 6, wherein the visibly perceptible together operation of the selected devices includes emission of light or display of image by the selected devices.

8. A method for synchronizing operations by a plurality of devices that are perceptible together by a user, comprising:
   sending, by a gateway device coupling the plurality of devices to a network, a calibration control signal to each of the plural devices;
   receiving, by the gateway device, from each of the plural devices, in response to the calibration control signal, timing information associated with performance of the perceptible together operation of the device;
   determining, by the gateway device, respective synchronizing control signals for the plural devices based at least in part on the respective timing information received from the plural devices, the synchronizing control signals to control the performance of the perceptible together operations so their performances are perceptibly synchronous; and sending, by the gateway device, the synchronizing control signals to the respective plural devices to synchronize the performance of the perceptible together operation by the plural devices.

9. The method of claim 8, wherein receiving timing information comprises receiving timing information from each of the plural devices that includes a reply indicating the perceptible together operation of the device has commenced.

10. The method of claim 9, wherein the synchronizing control signal of each device includes a timing component associated with synchronizing the performance of the perceptible together operation by the device with the performance of the perceptible together operation by other ones of the plural devices.

11. The method of claim 10, wherein the timing component of the synchronizing control signal provided to each device is based at least in part correspondingly on the timing information received from the device.

12. The method of claim 10, wherein the timing information from the plural devices includes timing information from at least one device indicating a device response time of greatest duration relative to device response times of the other devices and wherein the synchronizing control signals provided to the plural devices include a common timing component that is based at least in part on the device response time of greatest duration.

13. The method of claim 8, wherein the perceptible together device operation of the plural devices includes an operation audibly perceptible together by the user.

14. At least one non-transitory computer-readable medium including instructions to cause a gateway device coupling a plurality of devices to a network, in response to execution of the instructions by one or more processors of the gateway device, to:

send a calibration control signal to each of plural devices;

receive, from each of the plural devices, in response to the calibration control signal, timing information associated with performance of an operation, the respective performance of the operation by each device is perceptible together by a user;

determine respective synchronizing control signals for the plural devices, based at least in part on the respective timing information received from the plural devices, the synchronizing control signals to control the performance of the perceptible together operations so their performances are perceptibly synchronous; and send the respective synchronizing control signals to the plural devices to synchronize the performance of the perceptible together operation by the plural devices.

15. The at least one non-transitory computer-readable medium of claim 14, wherein receipt of timing information comprises receive of timing information from each of the plural devices that includes a reply indicating the perceptible together operation of the device has commenced.

16. The at least one non-transitory computer-readable medium of claim 14, wherein the synchronizing control signal of each device includes a timing component associated with synchronizing the performance of the perceptible together operation by the device with the perceptible together operation by other ones of the plural devices.

17. The at least one non-transitory computer-readable medium of claim 16, wherein the timing component of the synchronizing control signal provided to each device is based at least in part correspondingly on the timing information received from the device.

18. The at least one non-transitory computer-readable medium of claim 16, wherein the timing information from the plural devices includes timing information from at least one device indicating a device response time of greatest duration relative to device response times of the other devices and wherein the synchronizing control signals provided to the plural devices include a common timing component that is based at least in part on the device response time of greatest duration.

19. The at least one non-transitory computer-readable medium of claim 14, wherein the perceptible together operations of the plural devices include an operation visibly perceptible together by the user.

20. The gateway apparatus of claim 1 wherein the perceptible together device operation of the plural devices includes an operation audibly perceptible together by the user.

21. The method of claim 8, wherein the perceptible together operation of the plural devices includes an operation visibly perceptible together by the user.

22. The at least one non-transitory computer-readable medium of claim 14, wherein the perceptible together device operation of the plural devices includes an operation audibly perceptible together by the user.

* * * * *